United States Patent
Deshpande et al.

(10) Patent No.: US 7,685,293 B2
(45) Date of Patent: Mar. 23, 2010

(54) METHOD AND APPARATUS FOR OPTIMIZATION OF SIGCOMP UDVM PERFORMANCE

(75) Inventors: Manoj M. Deshpande, San Diego, CA (US); Adrian Escott, San Diego, CA (US); Kirti Gupta, San Diego, CA (US); Ramachandran Subramaniam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 251 days.

(21) Appl. No.: 11/842,802

(22) Filed: Aug. 21, 2007

(65) Prior Publication Data

US 2009/0055899 A1 Feb. 26, 2009

(51) Int. Cl.
*G06F 15/16* (2006.01)
*G06F 15/173* (2006.01)

(52) U.S. Cl. .................. 709/227; 709/225; 709/239
(58) Field of Classification Search .......... 709/239, 709/227, 225
See application file for complete search history.

(56) References Cited

U.S. PATENT DOCUMENTS

2006/0072523 A1* 4/2006 Richardson et al. ......... 370/338
2006/0259598 A1* 11/2006 Kim et al. ................... 709/222

* cited by examiner

*Primary Examiner*—Paul H Kang
(74) *Attorney, Agent, or Firm*—Florin Corie

(57) ABSTRACT

A mobile communication system that utilizes multiple access technologies achieves multiple session registrations by deriving a plurality of extended unique device identifications from a specific unique device identification (e.g., private user identification (PIID) stored on a subscriber identity module (SIM)) assigned to a user equipment. Each of the plurality of extended unique device identifications have the benefit of allowing multiple registrations with one or more access networks while allowing a home subscriber system to detect the one unique device identification embedded in the extended unique device identifications for authentication purposes. Thereby, a large population of deployed UEs and access network infrastructure may benefit without replacement by allowing a UE to maintain session continuity when transitioning between access networks, to select a preferred access technology when in overlapping coverage areas without session interruption, or to maintain multiple sessions (e.g., simultaneous Voice over IP (VoIP) and media streaming) with different access networks.

24 Claims, 7 Drawing Sheets

METHOD AND APPARATUS FOR OPTIMIZATION OF SIGCOMP UDVM PERFORMANCE

BACKGROUND

This invention relates to session continuity for data packet wireless communication between networks using different communication standards.

Wireless communication proliferates with introductions of new transmission modes, communication protocols, and types of communication content. Examples of wireless communication systems include the public land mobile network (PLMN) and the wireless local area network (WLAN). In order for a mobile station, also referred to as user equipment (UE), to have access to a communication channel at various locations, increasingly a multi-access or multi-mode capability is incorporated into a single handheld UE. In addition, more functionality is being incorporated, including voice and data services. This integration poses challenges for seamless multi-access and session continuity as the UE moves within range of various access networks. The interworking between Third Generation Partnership Project (3GPP) (e.g., Global System for Mobile Communications/General Packet Radio Service (GSM/GPRS), Wideband Code Division Multiple Access (WCDMA), High Speed Downlink Packet Access (HSDPA)) and other access technologies such as IEEE 802.11 (WiFi), for instance, creates situations where interruptions in service or inability to multi-access are likely.

Multi-access refers to the ability to use multiple different access networks with a single communications device. The communications device may, for example, be connected to the Internet at first using a WLAN and, when outside the coverage of the WLAN network, using conventional circuit switch (CS) communications network.

Session continuity refers to maintaining upper level connections, for example transport level connection for a data packet protocol communication, when the access technology, that is the link layer, changes. This means, for example, that applications in a communications device or user of a communication device does not notice changes in access technology or interruptions in connectivity.

Examples of access technologies and communication services include traditional CS services (i.e., voice/Short Message Service (SMS)) along with some packet data service (e.g., presence and instant messaging) over GSM and Universal Mobile Telecommunication System (UMTS) access. Voice Over IP (VoIP), SMS-IP, and other packet data services (e.g., push-to-talk, video sharing, etc.) are available over Wireless Fidelity (WiFi) as well as UMTS/HSDPA. Some services, such as broadcast/multicast, are available over UMTS but not HSDPA/WiFi.

Considerable deployment of wireless infrastructure and UEs have been made utilizing IMS (IP Multimedia Subsystem), which is an internationally recognized standard that specifies interoperability and roaming between devices and provides bearer network control and security. It is also well integrated with existing voice and data networks, and hence makes IMS an important enabling technology for fixed-mobile devices. IMS also makes efficient use of existing circuit- and packet-switched technologies. The third generation (3G) IMS comprises a core network subsystem within the Universal Mobile Telecommunication System (UMTS), which uses the Session Initiation Protocol (SIP) to initiate, modify and terminate multimedia sessions. IMS also uses the IETF Session Description Protocol (SDP) to define session parameters, as well as negotiate codecs to be used during the multimedia session.

The IMS architecture requires that each UE register the network address provided by the access network by sending a unique device identifier that is authenticated by a home service provider. The problem thus is that a UE cannot maintain simultaneous registrations via different access technologies, such as WLAN, UMTS, 1x Evolution-Data Optimized (EV-DO), etc. Thus, it is not possible to maintain session continuity, to deliver services over a preferred access, or to have simultaneous services over different accesses.

With regard to the first scenario of maintaining session continuity over multiple access technologies, considerable development has addressed certain aspects of the problem. Mobile IP protocol takes care that data packets relating to a communication device's home IP address are routed from a home network to a care-of address at a mobile location of the communication device. While this allows certain simultaneous registration, the Mobile IP provisioning functionality at the network end imposes certain challenges for implementation. In addition, the Mobile IP protocol entails extra headers relating to tunneling to be present in data packets. Given the limited throughput typical of wireless access networks, this overhead tends to degrade the data transfer capabilities to utilize Mobile IP.

It has also been proposed that changes be made to the IMS architecture so that at the point where the communication converges from two access networks. The unique device identifier would be detected with the two different network addresses with some provisions made to allow simultaneous registrations when desired and to override a prior registration in other situations. However, such an implementation assumes that the two communication channels would have network addresses assigned by different proxy call session control function (P-CSCF), which is not necessarily the case.

With regard to the second scenario of automatically switching to a preferred access network, it is possible that a UE is within the coverage of multiple access networks (e.g., UMTS and WiFi). A user of the UE may prefer to receive a service (e.g., push-to-talk) over a particular access network (e.g., UMTS). However, this would require the UE to be registered in the IMS domain over both WiFi and UTMS access networks, which is prevented.

With regard to the third scenario of simultaneous services, it may be desirable for the UE to receive different services over multiple accesses simultaneously (e.g., video streaming over WiFi and push-to-talk over UMTS).

SUMMARY

The following presents a simplified summary in order to provide a basic understanding of some aspects of the disclosed versions. This summary is not an extensive overview and is intended to neither identify key or critical elements nor delineate the scope of such versions. Its purpose is to present some concepts of the described versions in a simplified form as a prelude to the more detailed description that is presented later.

A user equipment registers selectively to more than one IMS (IP Multimedia Subsystem) capable access network by emulating more than one unique device identifier in a session initiation protocol (SIP) registration request so that a new IMS registration does not necessarily cause the overwriting of an assigned network address to correspond to the new access network. The SIP registrar server or home subscriber server is still able to discern the unique device identifier within the registration information and enables the multiple sessions. Thereby, uses are supported whereby the user equipment seeks to enhance session continuity, seeks to utilize preferred access networks when coverage exists for multiple access networks, or wants to utilize multiple access networks simultaneously.

In one aspect, a method for supporting multiple session registrations of a data packet protocol for a user equipment assigned a unique device identifier is by receiving a plurality of registration requests from a user equipment. Each registration request appears unique in that the unique device identifier is appended to one of a plurality of registration extensions so that the access network(s) do not necessarily drop an earlier session from the same user equipment. Yet, a downstream enabler of the multiple sessions is still capable of detecting the unique device identifier, authenticating that the unique device identifier is a subscriber, and allowing the multiple data packet sessions.

In an additional aspect, at least one processor is configured to support multiple session registrations of a data packet protocol for a user equipment assigned a unique device identifier by having modules for receiving a plurality of registration requests from a user equipment. Each registration request appears unique in that the unique device identifier is appended to one of a plurality of registration extensions so that the access network(s) do not necessarily drop an earlier session from the same user equipment. Yet, a downstream enabler of the multiple sessions is still capable of detecting the unique device identifier, authenticating that the unique device identifier is a subscriber, and allowing the multiple data packet sessions.

In yet an additional aspect, a computer program product has a computer-readable medium containing sets of codes for causing a computer to support multiple session registrations of a data packet protocol for a user equipment assigned a unique device identifier is by receiving a plurality of registration requests from a user equipment. Each registration request appears unique in that the unique device identifier is appended to one of a plurality of registration extensions so that the access network(s) do not necessarily drop an earlier session from the same user equipment. Yet, a downstream enabler of the multiple sessions is still capable of detecting the unique device identifier, authenticating that the unique device identifier is a subscriber, and allowing the multiple data packet sessions.

In another aspect, an apparatus for supporting multiple SIP registrations is given that has a means for receiving a first SIP registration request from a user equipment comprising a unique device identifier for the user equipment appended to one of a plurality of registration extensions. A means is provided for detecting the unique device identifier, authenticating that the unique device identifier is a subscriber, and responding with a network address to enable a first data packet protocol session. In addition, a means is provided for receiving a second SIP registration request from the user equipment comprising the unique device identifier appended to another of the plurality of registration extension, for detecting the unique device identifier, authenticating that the unique device identifier is a subscriber, and responding with a second network address to enable a second data packet protocol session.

In yet another aspect, an apparatus for supporting multiple session registrations of a data packet protocol includes user equipment having memory that contains a unique device identifier. A processor generates SIP registration requests comprising the unique device identifier appended to one of a plurality of registration extensions and for generating a second SIP registration comprising the unique device identifier appended to another of the plurality of registration extensions. At least one transceiver sends the SIP registration requests to at least one SIP proxy server and receives corresponding network addresses to establish multiple data packet protocol sessions. An SIP registrar server includes a memory containing a subscriber database containing the unique device identifier and a temporary network address data structure. A processor detects the unique device identifier and the network addresses in communications from the at least one SIP proxy. By authenticating the unique device identifier and by recognizing the multiple sessions, the processor enables multiple simultaneous registrations for the user equipment.

In another aspect, a method for initiating multiple session registrations of a data packet protocol for a user equipment assigned a unique device identifier utilizes the method of sending first and second SIP registration requests, each made to appear unique by appending an extension to the unique device identifier and then utilizing two data packet protocol sessions established by the two requests.

In yet another aspect, at least one processor for initiating multiple session registrations of a data packet protocol for a user equipment assigned a unique device identifier comprises modules for sending first and second SIP registration requests, each made to appear unique by appending an extension to the unique device identifier and then utilizing two data packet protocol sessions established by the two requests.

In yet a further aspect, a computer program product has a computer-readable medium containing sets of codes for sending first and second SIP registration requests, each made to appear unique by appending an extension to the unique device identifier and then utilizing two data packet protocol sessions established by the two requests.

In an additional aspect, an apparatus is given for requesting multiple session registrations of a data packet protocol first uses means for sending first and second SIP registration requests, each made to appear unique by appending an extension to the unique device identifier and then a means for utilizing two data packet protocol sessions established by the two requests.

In yet another aspect, an apparatus for requesting multiple session registrations of a data packet protocol includes a transmitter for sending first and second session initiation protocol (SIP) registration requests of a unique device identifier for the user equipment appended to one of a plurality of registration extensions. The apparatus also includes a processor for utilizing first and second data packet protocol sessions in response to at least one access network detecting the unique device identifier, authenticating that the unique device identifier is a subscriber, and responding with a network address for each SIP registration request to enable the first and second data packet protocol sessions.

To the accomplishment of the foregoing and related ends, one or more versions comprise the features hereinafter fully described and particularly pointed out in the claims. The following description and the annexed drawings set forth in detail certain illustrative aspects and are indicative of but a few of the various ways in which the principles of the versions may be employed. Other advantages and novel features will become apparent from the following detailed description

DETAILED DESCRIPTION

A mobile communication system that utilizes multiple access technologies achieves multiple session registrations by deriving a plurality of extended unique device identifications from a specific unique device identification assigned to a user equipment. Each of the plurality of extended unique device identifications have the benefit of allowing multiple registrations with one or more access networks while allowing a home subscriber system to detect the one unique device identification embedded in the extended unique device identifications for authentication purposes. Thereby, a large population of deployed UEs and access network infrastructure may benefit without replacement by allowing a UE to maintain session continuity when transitioning between access networks, to select a preferred access technology when in overlapping coverage areas without session interruption, or to maintain multiple sessions (e.g., simultaneous Voice over IP (VoIP) and media streaming) with different access networks.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to concisely describing these versions.

Figure 1:
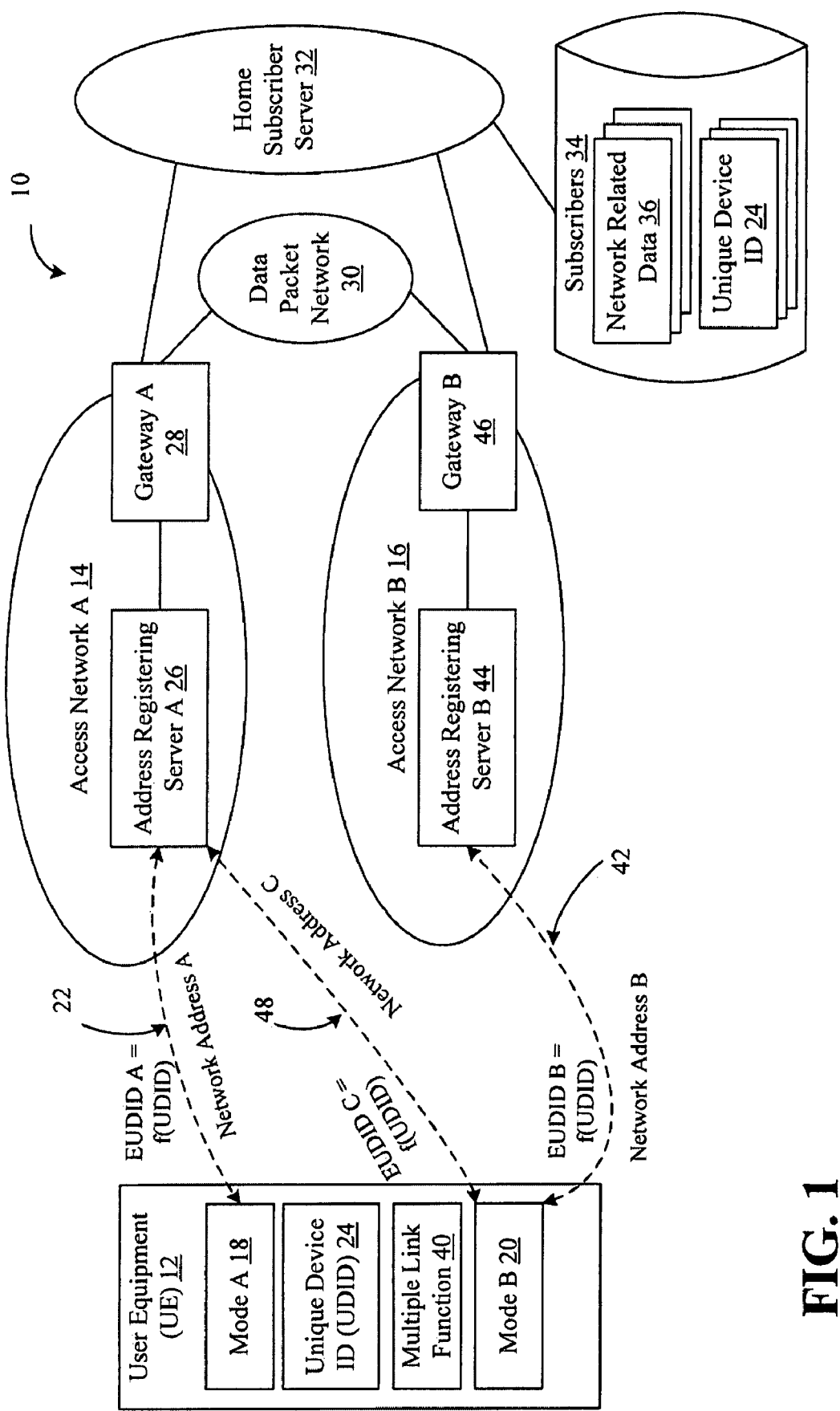
FIG. 1 is a diagram of a communication system wherein a user equipment may make registrations to two access networks.

With reference to FIG. 1, a communication system 10 enables a user equipment (UE) 12 to wirelessly communicate to at least two different access networks 14, 16 utilizing Mode A and B transceiver circuitry 18, 20, respectively. In particular, the UE 12 can start a session, depicted at 22, advantageously registering an extended unique device identifier (EUDID) A that includes a unique device identifier 24 stored on the UE 12. An address registering server A 26 of the access network 14 assigns a network address A to the UE 12 in order to establish the session and passes this information to a gateway 28 to a data packet network 30. A home subscriber server 32 detects the unique device ID 24 within the EUDID and authenticates this unique device ID 24 in a subscriber database 34 and stores the temporary network related information 36.

It should be appreciated with the benefit of the present disclosure that a multiple link function 40 incorporated into the UE 12 that embeds the unique device ID 24 into the EUDID has an advantage of providing a large if not unlimited number of variations for multiple registrations. The address registering server 26 of the access network A 14 would accept as a different registration each of the variations of the unique device ID 24 represented by the EUDID, yet the home subscriber server 32 can recognize the multiple registrations during authentication of each session. Moreover, already deployed UEs 12 having unique device IDs 24 already assigned may benefit from utilizing this approach without necessitating replacement and large-scale infrastructure modifications.

Thereafter, one of three situations occurs requiring an additional registration to an access network 14, 16. The first is when the UE 12 moves from the coverage area of access network A 14 to the coverage area of access network B 16 during a session registered with EUDID A and network address A. The multiple link function 40 of the UE 12 derives another EUDID B from the unique device ID 24 and transmits it as depicted at 42 from mode B transceiver circuitry 20 to an address registering server B 44. The address registering server B 44 of the access network B 14 assigns a network address B to the UE 12 in order to establish a session and passes this information to a gateway 46 to the data packet network 30. The home subscriber server 32 detects the unique device ID 24 within the EUDID B and authenticates this unique device ID 24 in the subscriber database 34 and stores the temporary network related information 36. Thereafter, the multiple link function 40 may maintain a seamless user experience during a transition when receiving over one or both of the two network addresses A, B to maintain session continuity.

In a second situation, the multiple link function 40 advantageously recognizes that the UE 12 is simultaneously within the coverage area of the two access networks 14, 16 and that a current session is not registered with the preferred access network. Thus, the multiple link function 40 initiates the second registration as previously described.

In a third situation, the multiple link function 40 of the UE 12 seeks to initiate multiple registrations with the same address registering server A 26, as depicted at 48. Use of a different EUDID allows the address registering server A 26 to register the UE 12 a second time, which would have been precluded if the same code had been used.

Figure 2:
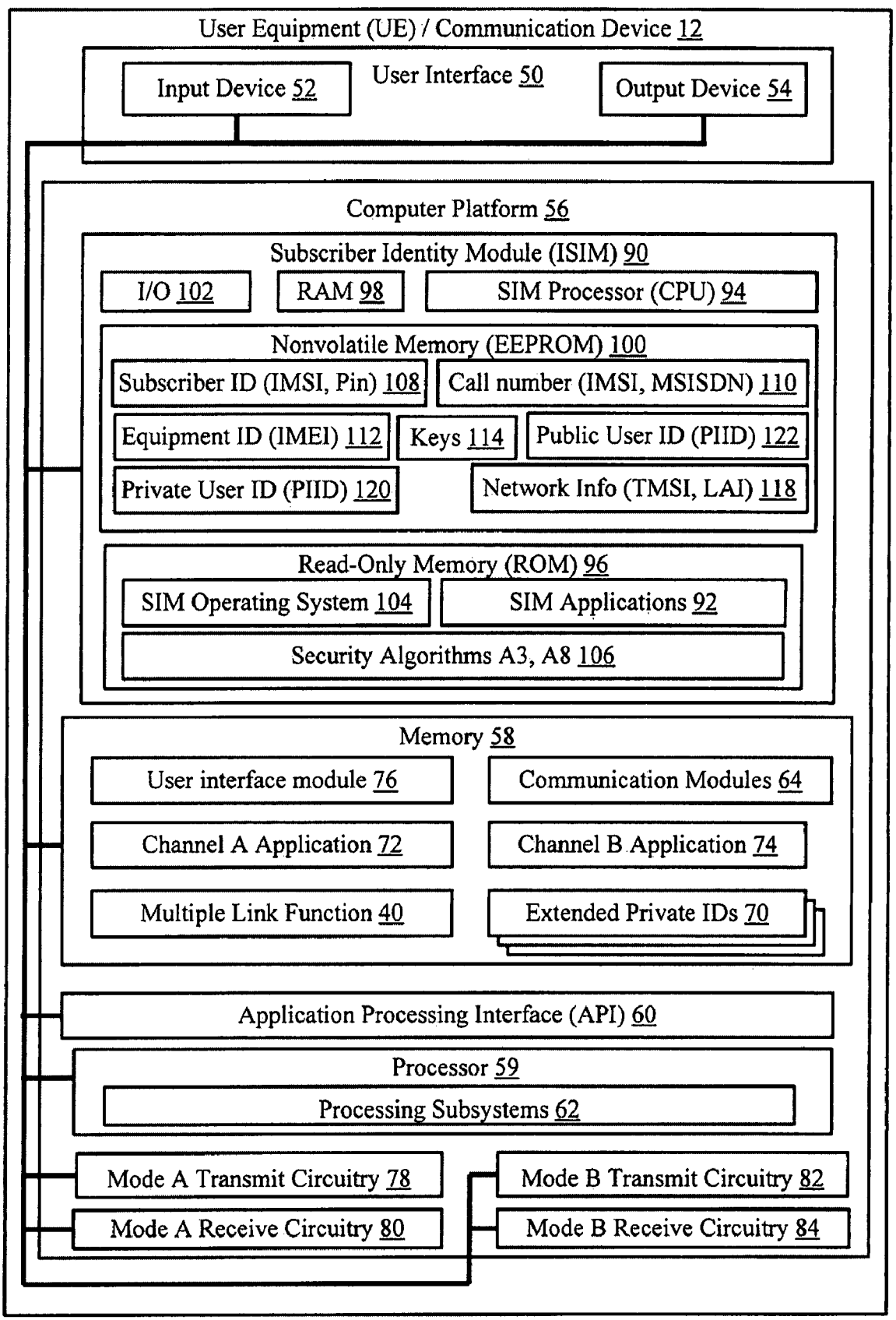
FIG. 2 is a schematic diagram of one aspect of components of the user equipment of the communication system of FIG. 1.

With reference to FIG. 2, according to some aspects, the UE 12 may comprise any type of computerized, communication device. For example, as illustrated in FIG. 2, the UE 12 may comprise a mobile communication device, such as a wireless and/or cellular telephone. Alternatively, the UE 12 may comprise a fixed communication device, such as a Proxy Call/Session Control Function (P-CSCF) server, a network device, a server, a computer workstation, etc. It should be understood that UE 12 is not limited to such a described or illustrated device, but may further include a Personal Digital Assistant (PDA), a two-way text pager, a portable computer having a wired or wireless communication portal, and any type of computer platform having a wired and/or wireless communications portal. Further, the UE 12 can be a remote-slave or other similar device, such as remote sensors, remote servers, diagnostic tools, data relays, and the like, which does not have an end-user thereof, but which simply communicates data across a wireless or wired network. In alternate aspects, the UE 12 may be a wired communication device, such as a landline telephone, personal computer, set-top box or the like. Additionally, it should be noted that any combination of any number of UEs 12 of a single type or a plurality of the afore-mentioned types may be utilized in the communication system 10. Therefore, the present apparatus and methods can accordingly be performed on any form of wired or wireless device or computer module, including a wired or wireless communication portal, including without limitation, wireless modems, Personal Computer Memory Card International Association (PCMCIA) cards, access terminals, personal computers, telephones, or any combination or sub-combination thereof.

Additionally, the UE 12 may include a user interface 50 for purposes such as requesting, interacting with, and/or playing multimedia content, performing voice or data communication, etc. This user interface 50 includes an input device 52 operable to generate or receive an input into the UE 12, and an output device 54 operable to generate and/or present information for consumption by the user of the UE 12. For example, input device 52 may include at least one device such as a keypad and/or keyboard, a mouse, a touch-screen display, a microphone in association with a voice recognition module, etc. In certain aspects, input device 52 may provide for user input of a request for content or for user input of a request for additional information. Further, for example, output device 54 may include a display, an audio speaker, a haptic feedback mechanism, etc. Output device 54 may generate a graphical user interface, a sound, a feeling such as a vibration, etc.

Further, UE 12 may include a computer platform 56 operable to execute applications to provide functionality to the device, and which may further interact with input device 52 and output device 54. Computer platform 56 may include a memory 58, which may comprise volatile and nonvolatile memory portions, such as read-only and/or random-access memory (RAM and ROM), erasable programmable read-only memory (EPROM), electrically erasable programmable read-only memory (EEPROM), flash memory, and/or any memory common to computer platforms. Further, memory 58 may include active memory and storage memory, including an electronic file system and any secondary and/or tertiary storage device, such as magnetic media, optical media, tape, soft and/or hard disk, and removable memory components.

Further, computer platform 56 may also include a processor 59, which may be an application-specific integrated circuit (ASIC), or other chipset, processor, logic circuit, or other data processing device. In some aspects, such as when UE 12 comprises a cellular telephone, processor 59 or other logic such as ASIC may execute an application programming interface (API) layer 60 that interfaces with any resident software components, such as voice call, data call, and media-related applications in memory 58. API 60 may be a runtime environment executing on the respective communication device. One such runtime environment is Binary Runtime Environment for Wireless® (BREW®) software developed by Qualcomm Incorporated of San Diego, Calif. Other runtime environments may be utilized that, for example, operate to control the execution of applications on wireless computing devices.

Additionally, processor 59 may include various processing subsystems 62 embodied in hardware, firmware, software, and combinations thereof, that enable the functionality of UE 12 and the operability of the UE 12 on communication system 10 (FIG. 1). For example, processing subsystems 62 allow for initiating and maintaining communications, and exchanging data, with other networked devices as well as within and/or among components of UE 12. In one aspect, such as in a cellular telephone, processor 59 may include one or a combination of processing subsystems 62, such as: sound, non-volatile memory, file system, transmit, receive, searcher, layer 1, layer 2, layer 3, main control, remote procedure, handset, power management, diagnostic, digital signal processor, vocoder, messaging, call manager, Bluetooth® system, Bluetooth® LPOS, position determination, position engine, user interface, sleep, data services, security, authentication, USIM/SIM (universal subscriber identity module/subscriber identity module), voice services, graphics, USB (universal serial bus), multimedia such as MPEG (Moving Picture Experts Group) protocol multimedia, GPRS (General Packet Radio Service), short message service (SMS), short voice service (SVS™), web browser, etc. For the disclosed aspects, processing subsystems 62 of processor 59 may include any subsystem components that interact with applications executing on computer platform 56. GPRS is a packet data communications system integrated with the GSM cellular telephone system.

Computer platform 56 may further include communication modules 64 that enables communications among the various components of UE 12, as well as being operable to exchange data and communication requests between the UE 12 and the communication system 10 (FIG. 1). Communication modules 64 may be embodied in hardware, firmware, software and/or combinations thereof, and may further include all protocols for use in intra-device and inter-device communications. Further, communication modules 64 are operable to transmit and/or receive information, in accordance with the apparatus and methods described herein.

The multiple link function 40 resident in memory 58 can utilize the communication modules 64 to initiate and maintain two separate network registrations, based upon extended unique device identification (EUDID) data structure 70 maintained in memory 58 so that a channel A application 72 and a channel B application 74 may execute in memory 66. In particular, the multiple link function 70 may maintain session continuity during a transition between channel applications 72, 74, may select a preferred channel application 72, 74, or maintain simultaneous channel applications 72, 74.

In some aspects, the memory 58 of the UE 12 may further store a user interface module 76 to operate the user interface 50, such as for retrieving, storing and playing multimedia content in a background or a foreground process or effecting a communication session. The user interface module 76 may comprise one or any combination of hardware, software, firmware, data and executable instructions operable to perform these functions, including a media player appropriate for the type of multimedia content and capabilities of the user interface 50.

The UE 12 can have multiple mode capability utilized by the communication module 64 by including Mode A transmit and receive circuitry 78, 80 (e.g., CS link) and Mode B transmit and receive circuitry 82, 84 (e.g., WiFi link).

In the illustrative UE 12 of FIG. 2, the computer platform 56 is provisioned for session initiation protocol (SIP) by including a subscriber identity module (SIM) 90 that may be compatible with, or encompass, one or more of a standard SIM, universal subscriber identity module (USIM), and an IMS subscriber identity module (ISIM).

In the exemplary version, the SIM 90 is a UICC (UMTS Integrated Circuit Card), which is the chip card used in mobile terminals in GSM and UMTS networks. The UICC ensures the integrity and security of all kinds of personal data. In a GSM network, the UICC contains a SIM application and in a UMTS network it is the USIM application. A UICC may contain several applications 92, making it possible for the same smartcard to give access to both GSM and UMTS networks, and also provide storage of a phone book and other applications. In support of UMTS release 5, the IP multimedia Services Identity Module (ISIM) is required for services in the IMS. IP Multimedia Services Identity Module (ISIM) is an application running on a UICC smart card in a 3G mobile telephone in the IP Multimedia Subsystem (IMS). It contains parameters for identifying and authenticating the user to the IMS. The ISIM application can co-exist with SIM and USIM on the same UICC making it possible to use the same smartcard in both GSM networks and earlier releases of UMTS.

The ISIM 90 consists of a SIM processor (CPU) 94, read only memory (ROM) 96, random access memory (RAM) 98, nonvolatile memory (e.g., EEPROM) 100 and input/output (I/O) circuitry 102. The ROM 96 contains a SIM operating system 104, the SIM applications 92, and security algorithms A3, A8 106. The RAM 98 is used for buffering transmission data and executing the applications 92, 106. The EEPROM 100 contains the unique device identification (UDID).

In the illustrative version, this unique device identification is derived from those codes stored in accordance with the SIM and ISIM standards. The SIM standard employs the following codes: International Mobile Subscriber Identity (IMSI), Temporary Mobile Subscriber Identity (TMSI), International Mobile Equipment Identity (IMEI), and Mobile Subscriber ISDN Number (MSISDN). The IMSI is a unique user identity that is stored in the SIM. To improve privacy, a TMSI is generated per geographical location. While IMSI/TMSI are used for user identification, the IMEI is a unique device identity and is phone specific. The MSISDN is the telephone number of a user. With IMS, the following additional identities are implemented: IP Multimedia Private Identity (IMPI) and IP Multimedia Public Identity (IMPU). To that end, the EEPROM 100 stores a Subscriber ID (IMSI, Pin) 108, a call number (IMSI, MSISDN) 110, equipment ID (IMEI) 112, keys Ki 114, and network-related information (TMSI, LAI) 118. LAI (Location Area Identity) identifies under which Base Station Controller the UE 12 is currently present. The EEPROM 100 also contains the private user identification (PIID) 120 and the public user identification (PUID) 122.

The use and content of the ISIM 90 can be protected by use of PIN codes (not depicted). One code, PIN1, can be defined to control normal use of the phone. Another code, PIN2, can be set, to allow the use of special functions (like limiting outbound telephone calls to a list of numbers). PUK1 and PUK2 (i.e., pin unlock key 1, 2) is used to reset PIN1 and PIN2 respectively.

With the ISIM 90 thus provisioned, the UE 12 may utilize Session Initiation Protocol (SIP), which is the protocol used for call control in the third generation mobile network starting from the 3GPP release 5. SIP uses textual encoding, which makes it easier to build services based on SIP, design extensions to SIP and debug the protocol. SIP is specified by the Internet Engineering Task Force (IETF) and comprises a highly generalized and widely applicable protocol for establishing user sessions across packet networks. SIP affords the capability for users to establish sessions that can transfer multimedia data, including for example voice, video, and audio, between two or more participants. The session is established according to a specified protocol including "invite" messages issued from a client requesting access to an asset on another device ("server").

At the most general level, SIP sessions utilize up to four major components: (i) SIP User Agents (UA) which are the UEs 12, such as cell phones, multimedia handsets, personal computers (PCs), personal digital assistants (PDAs), etc. used to create and manage a SIP session; (ii) SIP Registrar Servers, which are databases that contain the location of all User Agents within a particular domain; in SIP messaging, these servers retrieve and send participants' IP addresses and other pertinent information to the SIP Proxy Server; (iii) SIP Proxy Servers accept session requests made by a SIP UA and query the SIP Registrar Server to obtain the recipient UAs addressing information; the session invitation is then forwarded directly to the recipient UA if it is located in the same domain or to a Proxy Server if the UA resides in another domain; and (iv) SIP Redirect Servers which allow SIP Proxy Servers to direct SIP session invitations to external domains. SIP Redirect Servers may reside in the same hardware as SIP Registrar Servers and SIP Proxy Servers. Together, these systems deliver messages embedded with the SDP protocol defining their content and characteristics to complete a SIP session.

IMS (IP Multimedia Subsystem) is an internationally recognized standard that specifies interoperability and roaming between devices and provides bearer network control and security. It is also well integrated with existing voice and data networks, and hence makes IMS an important enabling technology for fixed-mobile devices. IMS also makes efficient use of existing circuit- and packet-switched technologies. The 3G IMS comprises a core network subsystem within the Universal Mobile Telecommunication System (UMTS), which uses the Session Initiation Protocol (SIP) to initiate, modify and terminate multimedia sessions. IMS also uses the IETF Session Description Protocol (SDP) to define session parameters, as well as negotiate codecs to be used during the multimedia session.

SIP runs atop different transport protocols such as the User Datagram Protocol (UDP) and the Transmission Control Protocol (TCP), and hence typically is implemented at the Session Layer. The IMS architecture (specified in 3GPP TS 23.22829) is built upon the UMTS packet domain. However, the IMS architecture is purposely designed so as to be forward-compatible with mechanisms for IP connectivity other than those utilized by the UMTS packet domain. This feature is known as "access network independence", and affords a significant degree of flexibility and forward compatibility. For example, in the context of security, the generalized IETF architecture of SIP allows several security/trust models to be defined, providing hop-by-hop, end-to-middle and end-to-end security solutions. The IETF SIP working group has accordingly defined several security mechanisms that can be applied to the different uses of SIP. These mechanisms offer, for example, authentication, message integrity, confidentiality, and replay protection. A 3GPP IMS subscriber has one IP multimedia private identity (IMPI) and at least one IP multimedia public identity (IMPU). To participate in multimedia sessions, an IMS subscriber must register at least one IMPU with the IMS. The private identity is generally used only for authentication purposes.

Figures 3, 4:
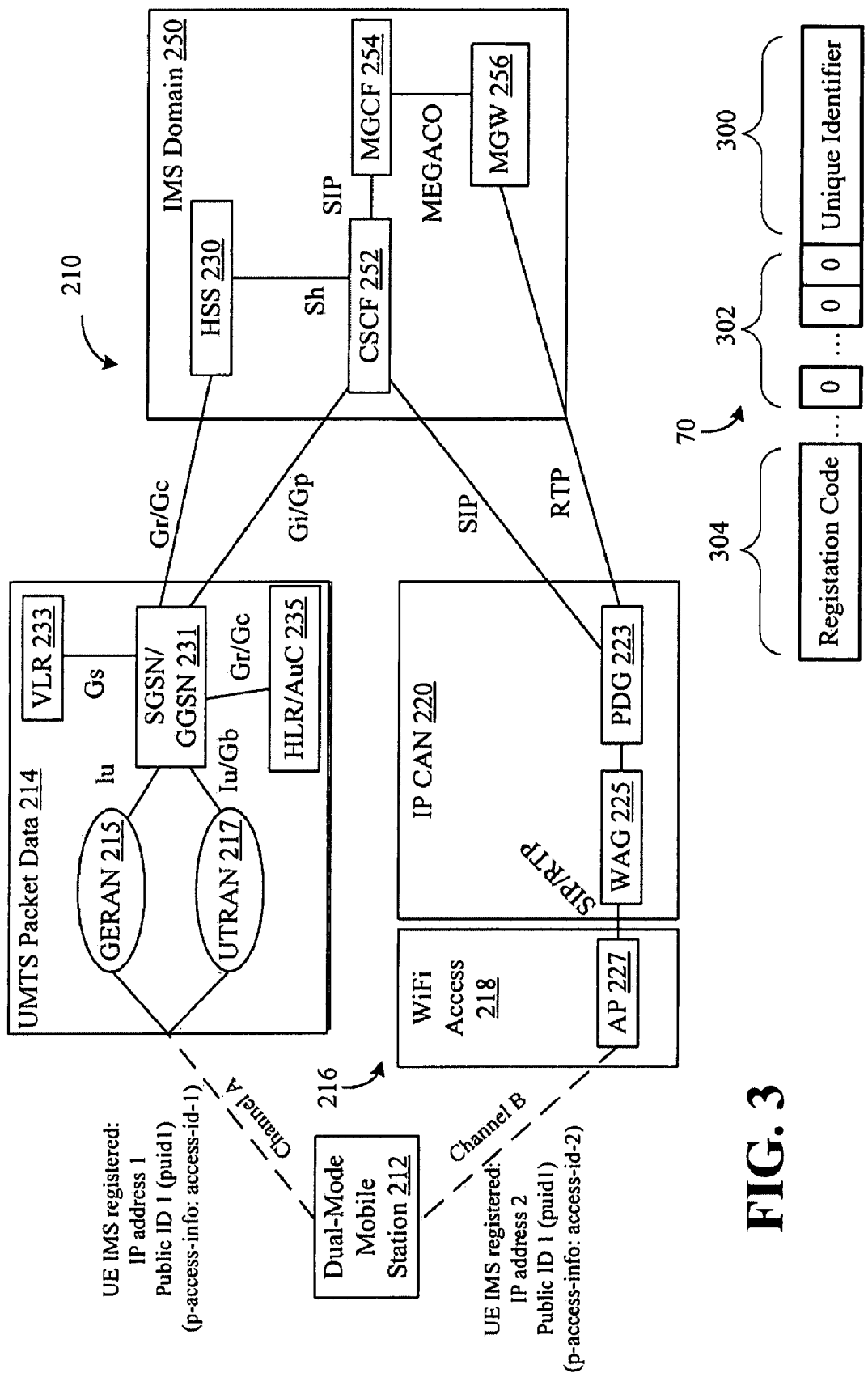
FIG. 3 is a block diagram of an Internet Protocol Multimedia Subsystem (IMS) communication system including a UTMS data packet access network and a Wireless Local Access Network (WLAN) in communication with a user equipment.
FIG. 4 is a data structure diagram for an extended unique device identifier utilized by the user equipment of FIG. 3.

With reference to FIG. 3, a dual mode communication system 210 is depicted as including a dual-mode mobile station 212 having a channel A wireless communication path to an IP-connectivity Access Network (IP CAN) A, connecting an IMS subscriber to IMS services, depicted as UMTS packet data network 214. Typically the IP CAN will be General Packet Radio Service (GPRS) either being supported by GSM EDGE Radio Access Network (GERAN) 215 or UMTS Terrestrial Radio Access Network (UTRAN) 217 functionality. The dual-mode mobile station 212 also has a channel B wireless communication path to an access network B 216, depicted as a WiFi access network 218 and an IP CAN 220 comprising a Packet Data Gateway (PDG) 223 communicating to a Wireless Access Gateway (WAG) 225 which is in SIP/IETF Realtime Transport Protocol (RTP) communication with a WiFi access point (AP) 227.

There are several IMS "entities" that are generally relevant to the 3G IMS architecture. The UE 12 contains the SIP user agent (UA) and the ISIM 90 that contains the IMS security information. As described, the ISIM 90 can be a distinct application sharing no data and functions with the USIM, or it can share data and security functions with the USIM or it can be a reused USIM. There can only be one ISIM 90 per IMPI. A proxy call session control function. (P-CSCF) acts as an outbound SIP proxy. The P-CSCF is the first contact point in the serving network and forwards SIP requests towards an interrogating call session control function (I-CSCF). The I-CSCF is the contact point in the home network and acts as a SIP proxy. It forwards SIP requests or responses towards a serving call session control function and may be located at any number of different locations. The Serving-Call Session Control Function (S-CSCF) may behave as a SIP registrar, a SIP proxy server and a SIP UA. Before the UE can send a SIP INVITE message to invoke a session, it must first register an IMPU with the S-CSCF. The registration of an IMPU is accomplished by the UE by sending a SIP REGISTER message towards the home network.

Sessions are established using INVITE messages. In one scenario, an INVITE message is sent from one UE to another, both of which reside in a 3GPP network. The INVITE from UE in the first Home Network first passes through a P-CSCF and then to an I-CSCF, which forwards the message to a home subscriber system (HSS) 230, which looks up to which S-CSCF the user is registered. A similar process is performed within the second Home Network, and the INVITE message is terminated, for example in another UE for a voice communication. The IMS transmission may now start, for example, by using the IETF Realtime Transport Protocol (RTP).

Returning to FIG. 3, the GERAN 215 communicates via Iu interface and the UTRAN 217 communicates via a IU/Gb interface to a Serving GPRS Support Node/Gateway GPRS Support Node (SGSN/GGSN) 231, which in turn is in communication via a Gs interface to a Visitor Location Register (VLR) 233, via a Gr/Gc interface to the HSS 230, and via a Gr/Gc interface to a Home Location Register/Authentication Center (HLR/AuC) 235. VLR 233 contains selected administrative information from the HLR 235, necessary for call control and provision of the subscribed services, for each mobile currently located in the geographical area controlled by the VLR 233.

Although each functional entity can be implemented as an independent unit, most manufacturers of switching equipment implement one VLR together with one Mobile services Switching Center (MSC), so that the geographical area controlled by the MSC corresponds to that controlled by the VLR. The MSC acts like a normal switching node of the PSTN or ISDN, and in addition provides all the functionality needed to handle a mobile subscriber, such as registration, authentication, location updating, handovers, and call routing to a roaming subscriber. These services are provided in conjunction with several functional entities, which together form the Network Subsystem. The MSC provides the connection to the public fixed network (PSTN or ISDN), and signaling between functional entities. The Home Location Register (HLR) provides the Call routing and (possibly international) roaming capabilities of GSM. The HLR contains all the administrative information of each subscriber registered in the corresponding GSM network, along with the current location of the mobile. There is logically one HLR per GSM network, but it may be implemented as a distributed database.

The HLR stores all permanent subscriber data and the relevant temporary data of all subscribers permanently registered in the HLR. The IMSI (International Mobile Subscriber Identity) and authentication data are stored in it. The Authentication Center (AuC) is a protected database that stores a copy of the secret key stored in each subscriber's SIM card, which is used for authentication and ciphering of the radio channel. The Visitor Location Register (VLR) 233 is a database—part of the GSM mobile phone system—which stores information about all the mobile stations that are currently under the jurisdiction of the MSC (Mobile Switching Center) which it serves. Of all the information it stores about each MS (Mobile Station), the most important is the current LAI (Location Area Identity). LAI identifies under which BSC (Base Station Controller) the MS is currently present. This information is vital in the call setup process. Whenever an MSC detects a new MS in its network, in addition to creating a new record in the VLR, it also updates the HLR of the mobile subscriber with the new location of that MS.

IMS domain 250 supports both access networks 214, 216 and includes the HSS 230. In particular, a call state control function (CSCF) 252 communicates with the HSS 230 via a Sh interface, communicates with the SGSN/GGSN 231 via an interface Gi/Gp, communicates via SIP signaling to the PDG 223, and via SIP signaling with Media Gateway Control Function (MGCF) 254, which in turn communicates via Media Gateway Control (IETF working group) (MEGACO) to media gateway (MGW) 256, which in turn communicates via RTP to the PDG 223.

FIG. 3 is annotated to denote simultaneous or sequential registration with mobile station 212 IMS registered over channel A at IP address 1, Public ID 1 (puid1) (p-access-info: access-id-1 and with mobile station 212 IMS registered over channel B at IP address 2, Public ID 1 (puid1) (p-access-info: access-id-2).

In FIG. 4, an exemplary version of the extended unique device identifier (EUDID) 70, which is one of many that can be derived from the one unique device identifier (e.g., PIID 120), begins with a unique identifier field 300 (e.g., the PIID 120). An extension field 302 can be appended to the unique identifier field 300. For instance, the extension field 302 can include three base-10 digits that will allow the UE 12 to have 1000 concurrent links. This approach allows passing through a conventional P-CSCF that would otherwise not allow multiple registrations. The EUDID 70 may advantageously include an identification field 304 that communicates an intention for multiple registrations for those P-CSCF capable of interpreting this information.

Thus, this EUDID 70 can be used to register without modifications to the P-CSCF by having the UE and S-CSCF emulate different IMPIs using the IMPI that is assigned to the device. As an example, UE-A is assigned IMPI=privateIDA@networkdomain.com. When registering with IP-address-1 via IP-CAN1, UE-A adds a suffix to the IMPI such as IMPI_ext1=privateIDA_ext1@networkdomain.com. When registering with IP-address-2 via IP-CAN2, UE-A adds a suffix to the IMPI such as IMPI_ext2=privateIDA_ext2@networkdomain.com. This allows the UE-A to send two REGISTER requests with different IMPIs from point of view of the P-CSCF. However, the S-CSCF recognizes the extensions to the IMPI and removes the extension before querying the HSS etc. Thus, this solution only requires an upgrade in the UE and S-CSCF behavior. There is no dependency on the P-CSCF and no protocol change is required.

Figure 5:
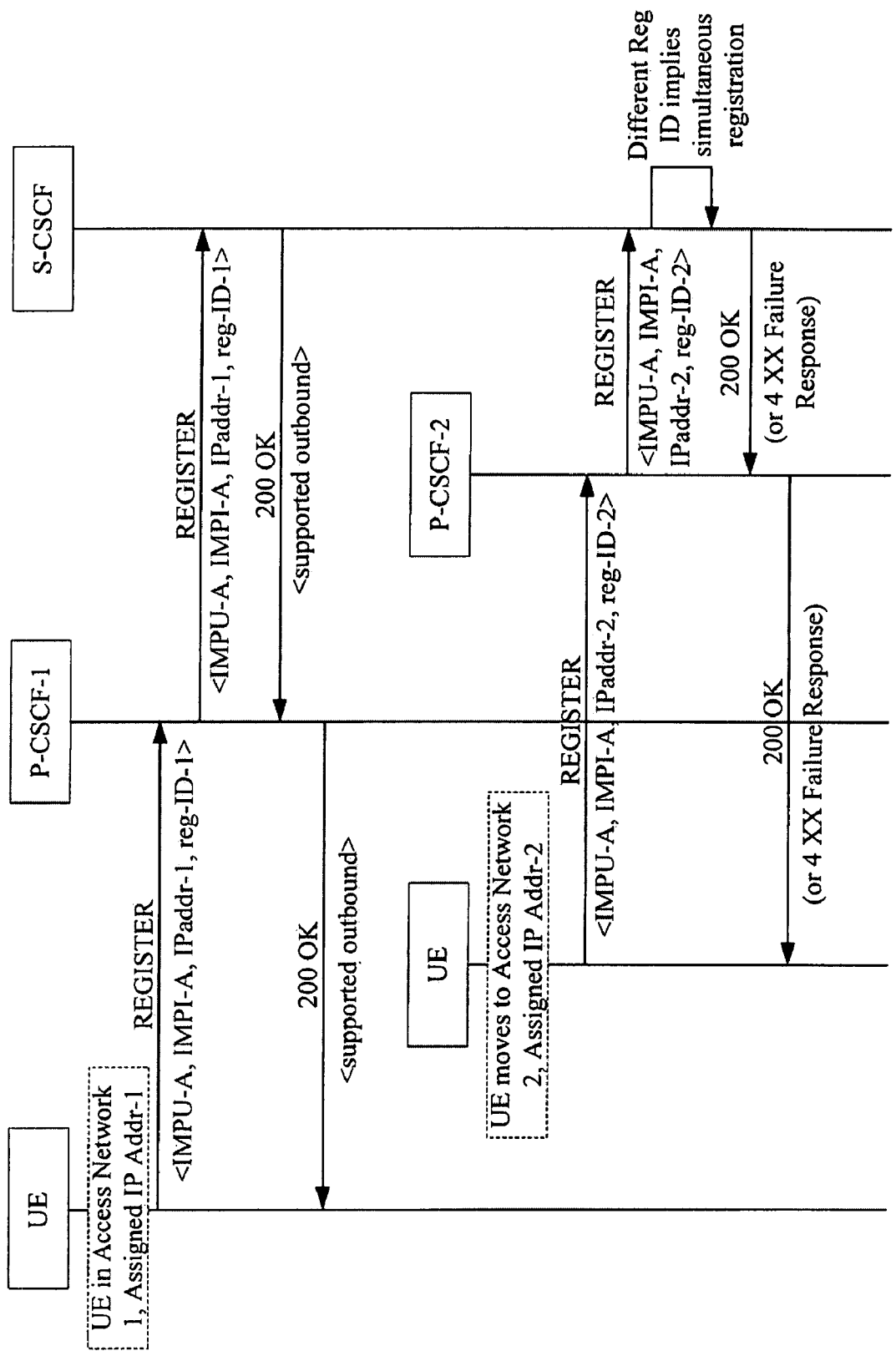
FIG. 5 is a message flow diagram of use of different registration identifications by a user equipment implying simultaneous registration.
Figure 6:
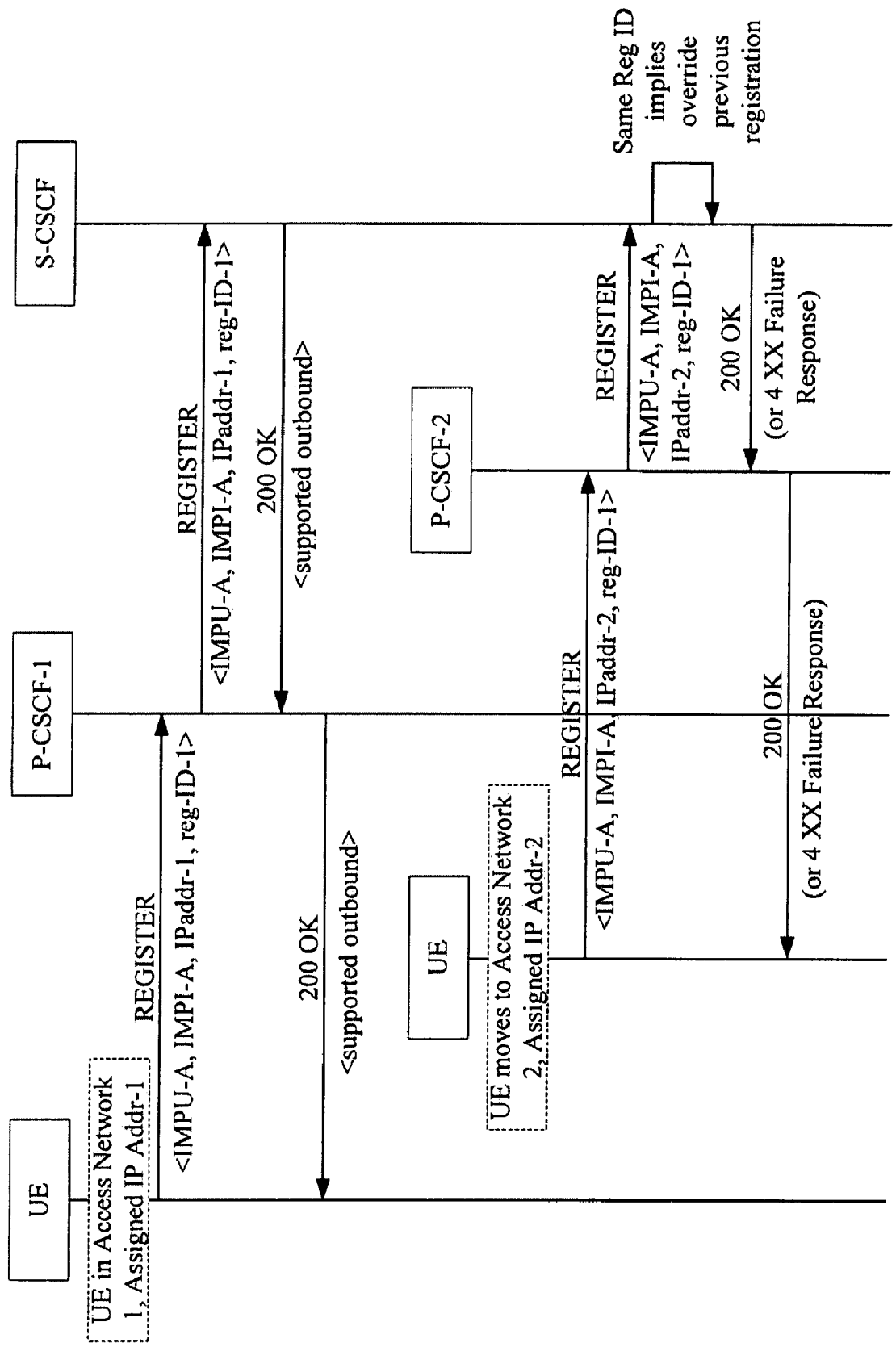
FIG. 6 is a message flow diagram of use of the same registration identification by a user equipment implying overriding registration.
Figure 7:
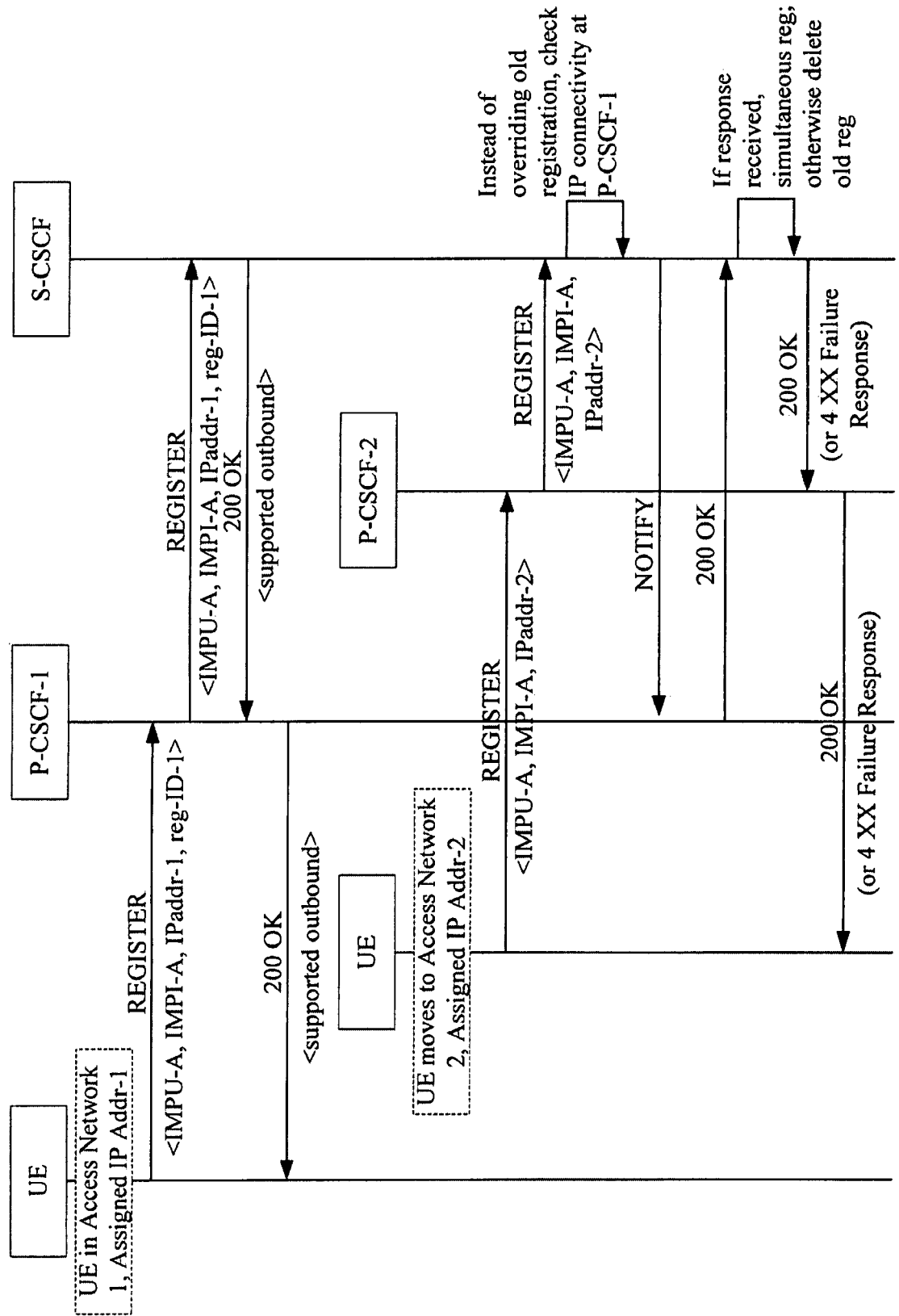
FIG. 7 is a message flow diagram of change in Serving-Call Session Control Function (C-CSCF) behavior to support simultaneous registrations.

In FIGS. 5-7, an approach is first presented for multiple registrations that entails modifications to the third stage of a 3G IMS architecture. Then FIG. 8 advantageously generalizes this approach by making modifications to the first stage to address a limitation. First, to re-cap the existing limitation with regard to supporting multiple registrations in today's IMS specifications. Consider a scenario when a UE A is in WLAN access and assigned IP-address-1. UE A is registered in IMS with <IMPU-A, IMPI-A, IP-address-1>. Then, UE A moves to UMTS network and is assigned IP-address-2. If UE-A registers with <IMPU-A, IMPI-A, IP-address-2>, the previous registration is over-ridden.

In FIGS. 5-7, a recent, but generally-known proposal addresses supports simultaneous IMS registrations when changing the IP-CAN by requiring communicating via a new P-CSCF, and means that a new IP address is assigned. The solution considers the following situation: UE A is connected through IP-CAN-1 to PCSCF-1. UE A is assigned IP-address-1 and is registered in IMS. UE A moves to IP-CAN-2 and is now connected to IMS through PCSCF-2. UE A is now assigned IP-address-2. Two options are proposed for supporting simultaneous registrations in such a scenario: (1) Protocol Changes in UE and S-CSCF—When registering from new IP-CAN-2, UE uses a "Reg-ID" to help S-CSCF separate different registrations When UE-A registers via IP-CAN-2, P-CSCF-2, it includes a "reg-id" (see draft-ietf-sip-outbound) to help S-CSCF separate different registrations. Also, if S-CSCF supports simultaneous registrations, it responds with "supported: outbound".

S-CSCF-a authenticates and accepts the registration. In case UE really wants to override the old registration instead of maintaining simultaneous registrations, the UE simply sends the subsequent REGISTER message with the same "reg-id". This is shown below.

A change should be noted in S-CSCF behaviour—S-CSCF checks connectivity to the UE via old P-CSCF-1 and IP-CAN-1. S-CSCF checks connectivity to UE-A via IP-CAN-1, P-CSCF-1 by issuing a NOTIFY (for the reg-event, possibly with event attribute set to "shortened" to trigger a re-authentication). This is a change in S-CSCF behaviour as today the S-CSCF (according to 24.229) would de-register the UE-A's contact via IP-CAN-1/P-CSCF-1.

Figure 8:
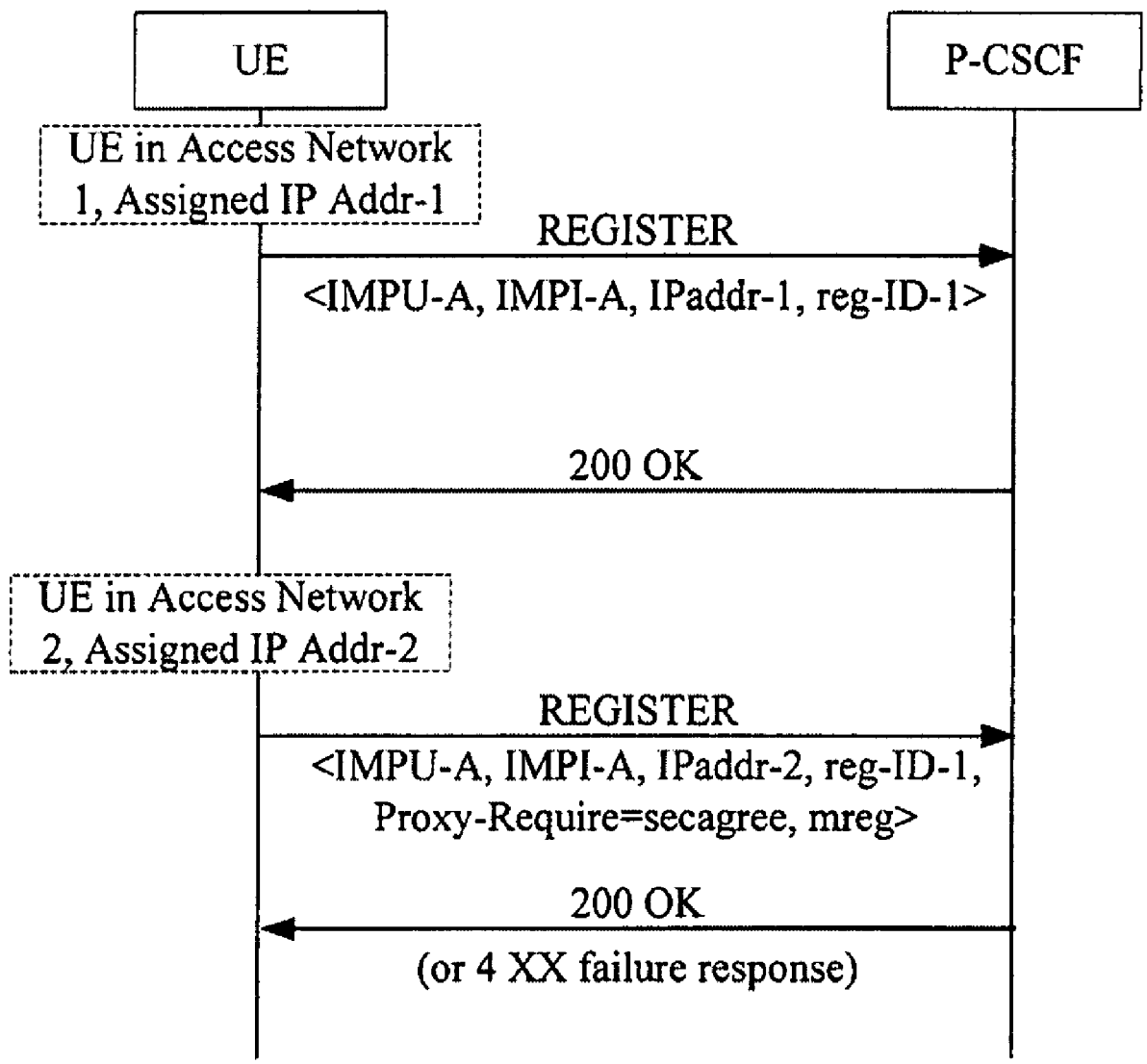
FIG. 8 is a message flow diagram of simultaneous registration support in Proxy-Call Session Control Function (P-CSCF).

In FIG. 8, a further feature is disclosed that obviates the need to route through different P-CSCFs, which currently only have one security mapping for each IMPI. Thus, we propose a solution below for the P-CSCF to support multiple security mappings for one IMPI when needed. The issues addressed include letting the P-CSCF whether UE is requesting simultaneous registrations or not and informing the UE if the current P-CSCFs does support simultaneous registrations. Thus, the protocol changes in UE and P-CSCF are as follows. When registering from new IP-CAN-2, UE uses "mreg" field in the "Proxy-Require" header to help P-CSCF separate different security associations for the same IMPI. When the P-CSCF receives the value "mreg" in "Proxy-Require" header, the P-CSCF that supports this extension recognizes the need to maintain multiple security associations for the same UE (IMPI). A P-CSCF that does not recognize this extension rejects the REGISTER request with a failure response. On receipt of a failure response, the UE may re-REGISTER without asking for simultaneous registrations (i.e., without the "mreg" field in "Proxy-Require" header). Thus, we have a full solution by combining the approach of FIGS. 5-7 with FIG. 8. However, this solution depends on whether the P-CSCF in the path is upgraded to support simultaneous registrations or not.

Therefore, while the foregoing disclosure shows illustrative aspects, it should be noted that various changes and modifications could be made herein without departing from the scope of the described aspects as defined by the appended claims. Furthermore, although elements of the described aspects may be described or claimed in the singular, the plural is contemplated unless limitation to the singular is explicitly stated.

In addition, while a particular feature may have been disclosed with respect to only one of several implementations, such feature may be combined with one or more other features of the other implementations as may be desired and advantageous for any given or particular application. To the extent that the terms "includes," and "including" and variants thereof are used in either the detailed description or the claims, these terms are intended to be inclusive in a manner similar to the term "comprising." Furthermore, the term "or" as used in either the detailed description of the claims is meant to be a "non-exclusive or".

Furthermore, although elements of the described aspects and/or versions may be described or claimed in the singular, the plural is contemplated unless limitation to the singular is explicitly stated. Additionally, all or a portion of any aspect and/or version may be utilized with all or a portion of any other aspect and/or version, unless stated otherwise.

What is claimed is:

1. A method for supporting multiple session registrations of a data packet protocol for a user equipment assigned a unique device identifier, comprising:

receiving a first session initiation protocol (SIP) registration request from a user equipment, the first SIP registration request comprising a first extended unique device identifier (EUDID), the first EUDID including a unique device identifier for the user equipment and a first one of a plurality of registration extensions;

detecting the unique device identifier located in the first EUDID, authenticating that the user equipment is a subscriber based at least in part on the unique device identifier, and establishing a first packet data session for the user equipment;

receiving a second SIP registration request from the user equipment, the second SIP registration request comprising a second EUDID including the unique device identifier and a second one of the plurality of registration extensions; and detecting the unique device identifier located in the second EUDID, authenticating that the user equipment is a subscriber based at least in part on the unique device identifier, and establishing a second packet data session for the user equipment.

2. The method of claim 1, wherein receiving the first and second SIP registration requests further comprising establishing multiple sessions through a single SIP proxy server.

3. The method of claim 1, further comprising:
establishing the first SIP registration with a first access network; and
establishing the second SIP registration with a second access network.

4. The method of claim 3, further comprising:
accessing a preference for receiving a communication service from the second access network;
establishing the first SIP registration with the first access network in response to the second access network being unavailable; and
establishing the second SIP registration with the second access network when available while maintaining session continuity.

5. The method of claim 3, further comprising:
establishing the first SIP registration with the first access network to receive a communication service when the first access network is available;
establishing the second SIP registration with the second access network when available to receive the communication service when the second access network is available; and
maintaining communication service continuity by selectively switching between the two active SIP registrations.

6. The method of claim 3, further comprising:
establishing the first SIP registration to a cellular circuit switch; and
establishing the second SIP registration to a wireless local access network.

7. The method of claim 1, further comprising:
receiving a first multiple registration request at a first SIP proxy server; and
appending a multiple registration extension to the unique device identifier and transmitting to an SIP registrar server that detects the unique device identifier.

8. The method of claim 7, further comprising:
receiving a second multiple registration request at a second SIP proxy server;
responding with a failure message to the user equipment;
receiving the second SIP registration request from the user equipment comprising the unique device identifier appended to another of the plurality of registration extensions at the second SIP proxy server and forwarding to the SIP registrar server; and
detecting the unique device identifier and multiple registration at the SIP registrar server.

9. At least one processor configured to support multiple session registrations of a data packet protocol for a user equipment assigned a unique device identifier, comprising:
a first module for receiving a first session initiation protocol (SIP) registration request from a user equipment, the first SIP registration request comprising a first extended unique device identifier (EUDID), the first EUDID including a unique device identifier for the user equipment and a first one of a plurality of registration extensions;
a second module for detecting the unique device identifier located in the first EUDID, authenticating that the user equipment is a subscriber based at least in part on the unique device identifier, establishing a first packet data session for the user equipment;
a third module for receiving a second SIP registration request from the user equipment, the second SIP registration request comprising a second EUDID including the unique device identifier and a second one of the plurality of registration extensions; and
a fourth module for detecting the unique device identifier located in the second EUDID, authenticating that the user equipment is a subscriber based at least in part on the unique device identifier, and establishing a second packet data session for the user equipment.

10. A computer program product, comprising:
a computer-readable medium comprising:
a first set of codes for causing a computer to a first session initiation protocol (SIP) registration request from a user equipment, the first SIP registration request comprising a first extended unique device identifier (EUDID), the first EUDID including a unique device identifier for the user equipment and a first one of a plurality of registration extensions;
a second set of codes for causing the computer to detect the unique device identifier located in the first EUDID, authenticating that the user equipment is a subscriber base at least in part on the unique device identifier, establishing a first packet data session for the user equipment;
a third set of codes for causing the computer to receive a second SIP registration request from the user equipment, the second SIP registration request comprising a second EUDID including the unique device identifier and a second one of the plurality of registration extensions; and
a fourth set of codes for causing the computer to detect the unique device identifier located in the second EUDID, authenticating that the user equipment is a subscriber based at least in part o the unique device identifier, and establishing a second packet data session for the user equipment.

11. An apparatus for supporting multiple session registrations of a data packet protocol, comprising:
means for receiving a first session initiation protocol (SIP) registration request from a user equipment, the first SIP registration request comprising a first extended unique device identifier (EUDID), the first EUDID including a unique device identifier for the user equipment and a first one of a plurality of registration extensions;
means for detecting the unique device identifier located in the first EUDID, authenticating that the user equipment is a subscriber base at least in part on the unique device identifier, establishing a first packet data session for the user equipment;
means for receiving a second SIP registration request from the user equipment, the second SIP registration request comprising a second EUDID including the unique device identifier and a second one of the plurality of registration extensions; and
means for detecting the unique device identifier located in the second EUDID, authenticating that the user equipment is a subscriber based at least in part o the unique device identifier, and establishing a second packet data session for the user equipment.

12. An apparatus for supporting multiple session registrations of a data packet protocol, comprising:
a first receiver for receiving a first session initiation protocol (SIP) registration request from a user equipment, the first SIP registration request comprising a first extended unique device identifier (EUDID), the first EUDID including a unique device identifier for the user equipment and a first one of a plurality of registration extensions;
a server for detecting the unique device identifier located in the first EUDID, authenticating that the user equipment is a subscriber base at least in part on the unique device identifier, establishing a first packet data session for the user equipment;
a second receiver for receiving a second SIP registration request from the user equipment, the second SIP registration request comprising a second EUDID including the unique device identifier and a second one of the plurality of registration extensions; and
wherein the server detects the unique device identifier in the second SIP registration request, authenticates that the user equipment is a subscriber, and establishes a second packet data session for the user equipment.

13. A method for initiating multiple session registrations of a data packet protocol for a user equipment assigned a unique device identifier, comprising:

sending a first session initiation protocol (SIP) registration request comprising extended unique device identifier (EUDID), the first EUDID including a unique device identifier for the user equipment and a first one of a plurality of registration extensions;

utilizing a first data packet protocol session in response to an access network detecting the unique device identifier located in the first EUDID, authenticating that the user equipment is a subscriber based at least in part on the unique device identifier, and establishing a first packet data session for the user equipment;

sending a second SIP registration request, the second SIP registration request including a second EUDID, the second EUDID comprising the unique device identifier and a second one of the plurality of registration extensions; and utilizing a second data packet protocol session in response to an access network detecting the unique device identifier located in the second EUDID, authenticating that the user equipment is a subscriber based at least in part on the unique device identifier, and establishing a second packet data session for the user equipment.

14. The method of claim 13, wherein sending the first and second SIP registration requests further comprising establishing multiple sessions through a single SIP proxy server.

15. The method of claim 13, further comprising:
establishing the first SIP registration with a first access network; and
establishing the second SIP registration with a second access network.

16. The method of claim 15, further comprising:
accessing a preference for receiving a communication service from the second access network;
establishing the first SIP registration with the first access network in response to the second access network being unavailable; and
establishing the second SIP registration with the second access network when available while maintaining session continuity.

17. The method of claim 15, further comprising:
establishing the first SIP registration with the first access network to receive a communication service when the first access network is available;
establishing the second SIP registration with the second access network when available to receive the communication service when the second access network is available; and
maintaining communication service continuity by selectively switching between the two active SIP registrations.

18. The method of claim 15, further comprising:
establishing the first SIP registration to a cellular circuit switch; and
establishing the second SIP registration to a wireless local access network.

19. The method of claim 13, further comprising:
sending to a first SIP proxy server a first multiple registration request containing the unique device identifier for being forwarded to an SIP registrar server that detects the unique device identifier.

20. The method of claim 19, further comprising:
sending a second multiple registration request to a second SIP proxy server;
receiving a failure message from the second SIP proxy server;
sending the second SIP registration request to the second SIP proxy server comprising the unique device identifier appended to another of the plurality of registration extensions to the second SIP proxy server for forwarding to the SIP registrar server that detects the unique device identifier and multiple registration.

21. At least one processor configured to initiate multiple session registrations of a data packet protocol for a user equipment assigned a unique device identifier, comprising:
a first module for sending a first session initiation protocol (SIP) registration request comprising a first extended unique device identifier (EUDID), the first EUDID including a unique device identifier for the user equipment and a first one of a plurality of registration extensions;
a second module for utilizing a first data packet protocol session in response to an access network detecting the unique device identifier located in the first EUDID, authenticating that the user equipment is a subscriber based at least in part on the unique device identifier, and establishing a first packet data session for the user equipment;
a third module for sending a second SIP registration request, the second SIP registration request including a second EUDID, the second EUDID comprising the unique device identifier and a second one of the plurality of registration extensions; and
a fourth module for utilizing a second data packet protocol session in response to an access network detecting the unique device identifier located in the second EUDID, authenticating that the user equipment is a subscriber at least in part on the unique device identifier, and establishing a second packet data session for the unique equipment.

22. A computer program product, comprising:
a computer-readable medium comprising:
a first set of codes for causing a computer to send a first session initiation protocol (SIP) registration request comprising a first extended unique device identifier (EUDID), the first EUDID including a unique device identifier for the user equipment appended to a first one of a plurality of registration extensions;
a second set of codes for causing the computer to utilize a first data packet protocol session in response to an access network detecting the unique device identifier located in the first EUDID, authenticating that the user equipment is a subscriber based at least in part on the unique device identifier, and establishing a first packet data session for the user equipment;
a third set of codes for causing the computer to send a second SIP registration request comprising a second EUDID, the second EUDID including the unique device identifier and a second one of the plurality of registration extensions; and
a fourth set of codes for causing the computer to utilize a second data packet protocol session in response to an access network detecting the unique device identifier located in the second EUDID, authenticating that the user equipment is a subscriber based at least in part on the unique device identifier, and establishing a second packet data session for the unique equipment.

23. An apparatus for supporting multiple session registrations of a data packet protocol, comprising:
means for sending a first session initiation protocol (SIP) registration request comprising a first extended unique device identifier (EUDID), the first EUDID including a unique device identifier for the user equipment and a first one of a plurality of registration extensions;

means for utilizing a first data packet protocol session in response to an access network detecting the unique device identifier located in the EUDID, authenticating that the user equipment is a subscriber based at least in part on the unique device identifier, and establishing a first packet data session for the user equipment;

means for sending a second SIP registration request comprising a second EUDID, the second EUDID including the unique device identifier and a second one of the plurality of registration extensions; and means for utilizing a second data packet protocol session in response to an access network detecting the unique device identifier located in the EUDID, authenticating that the user equipment is a subscriber based at least in part on the unique device identifier, and establishing a second packet data session for the user equipment.

24. An apparatus for supporting multiple session registrations of a data packet protocol, comprising:

a transmitter for sending first and second session initiation protocol (SIP) registration requests, the first SIP registration request comprising a first extended unique device identifier (EUDID), the first EUDID including a unique device identifier for a user equipment and a first one of a plurality of registration extensions, and the second SIP registration request comprising a second EUDID, the second EUDID including the unique device identifier for the user equipment and a second one of the plurality of registration extensions;

a processor for utilizing first and second data packet protocol sessions in response to at least one access network detecting the unique device identifier, authenticating that the user device is a subscriber based at least in part on the unique device identifier, and establishing first and second data packet protocol sessions.

* * * * *